United States Patent [19]

Venuto

[11] 4,281,562
[45] Aug. 4, 1981

[54] UNIVERSAL ADAPTOR LINKAGE

[75] Inventor: Ralph A. Venuto, Blackwood, N.J.

[73] Assignee: Mr. Transmission, Inc., Camden, N.J.

[21] Appl. No.: 20,213

[22] Filed: Mar. 13, 1979

[51] Int. Cl.³ .......................... G05G 9/18; G05G 1/04
[52] U.S. Cl. ................................. 74/473 R; 29/401.1;
74/473 SW; 74/485; 74/519; 74/522; 403/4
[58] Field of Search ............. 74/473 R, 473 SW, 485,
74/519, 522; 29/401.1; 403/3, 4

[56] References Cited
U.S. PATENT DOCUMENTS

| 2,924,988 | 2/1960 | Primeau | 74/485 X |
| 3,744,336 | 7/1973 | Lancaster | 74/473 R |

Primary Examiner—Allan D. Herrmann
Attorney, Agent, or Firm—Harding, Earley & Follmer

[57] ABSTRACT

A universal adaptor linkage for connection between the transmission and the shift or linkage rod associated with the gear selector lever of an automobile comprising a lower linkage portion having at least one hole therein for selective connection to the shift or linkage rod, a center linkage portion having a hole therein for connection to the gear shift control valve trunnion of the transmission, a transverse linkage portion for connecting the upper end of the lower linkage portion to the lower end of the center linkage portion, an upper linkage portion extending upwardly from the center linkage portion and having at least one hole therein for selective connection to the shift or linkage rod, and an upper transverse linkage portion extending between the upper end of the center linkage portion and the lower end of the upper linkage portion.

10 Claims, 4 Drawing Figures

UNIVERSAL ADAPTOR LINKAGE

BACKGROUND OF THE INVENTION

1. Field of the Invention

This invention relates to a linkage that is useful in a number of different transmissions of different automobiles.

2. Description of the Prior Art

In the rebuilding of automobile transmissions, and in particular, the Ford Motor Company C4, C5 and FMX transmissions that have been supplied as original equipment in automobiles from 1965 through 1979, it has been a problem to provide and to stock the numerous different parts that are required. In order to effect a desirable reduction in the number of such parts that are required to be stocked, there has been a need to provide a single part that can be substituted for a number of different parts that are provided as original equipment in the different transmissions.

SUMMARY OF THE INVENTION

Among the objects of the invention is the provision of a linkage that is so devised as to be useful in a number of different transmissions provided in automobiles.

Specifically, an object of the invention is to provide such an adaptable or adaptor linkage for connection between the transmission gear shift control valve trunnion and one end of the shift or linkage rod that is associated with the gear selector lever of an automobile and has the other end thereof connected to the gear selector lever for adjustment thereby.

A more specific object of the invention is to provide such an adaptor linkage that may be used with any C4, C5 or FMX transmission irrespective of whether floor shift or steering column shift gear selection is provided in the automobile.

In accomplishing the foregoing and other objectives of the invention there is provided a universal adaptor linkage for C4, C5 and FMX transmissions for connection between the transmission gear shift control valve trunnion and the aforementioned shift or linkage rod.

The adaptor linkage includes lower linkage portion having two holes for selective connection depending upon the type of transmission, to the linkage rod. These holes are used with steering column gear selectors. The adaptor linkage further includes a center linkage portion having a hole for connection to the gear shift control valve trunnion of the transmission, a transverse linkage portion for connecting the upper end of the lower linkage portion to the lower end of the center linkage portion, and an upper linkage portion extending upwardly from the center linkage portion. The upper linkage portion of the adaptor linkage has three holes for selective connection depending upon the type of transmission, to the linkage rod. These holes are used with floor shift gear selectors. The adaptor linkage further includes an upper transverse linkage portion that extends between the upper end of the center linkage portion and the lower end of the upper linkage portion. Adjoining portions of the upper transverse and center linkage portions include a half moon cut out in the front edge of the linkage, as seen mounted on the transmission, to avoid hitting parts of the transmission. Additionally, the lower transverse linkage portion includes a squared cut out in its rear edge to avoid hitting parts of the transmission.

The foregoing and other objects, features and advantages of the invention become more apparent in the light of the following detailed description of the preferred embodiment thereof, as illustrated in the accompanying drawing.

DESCRIPTION OF THE PREFERRED EMBODIMENT

Figures 1, 2:
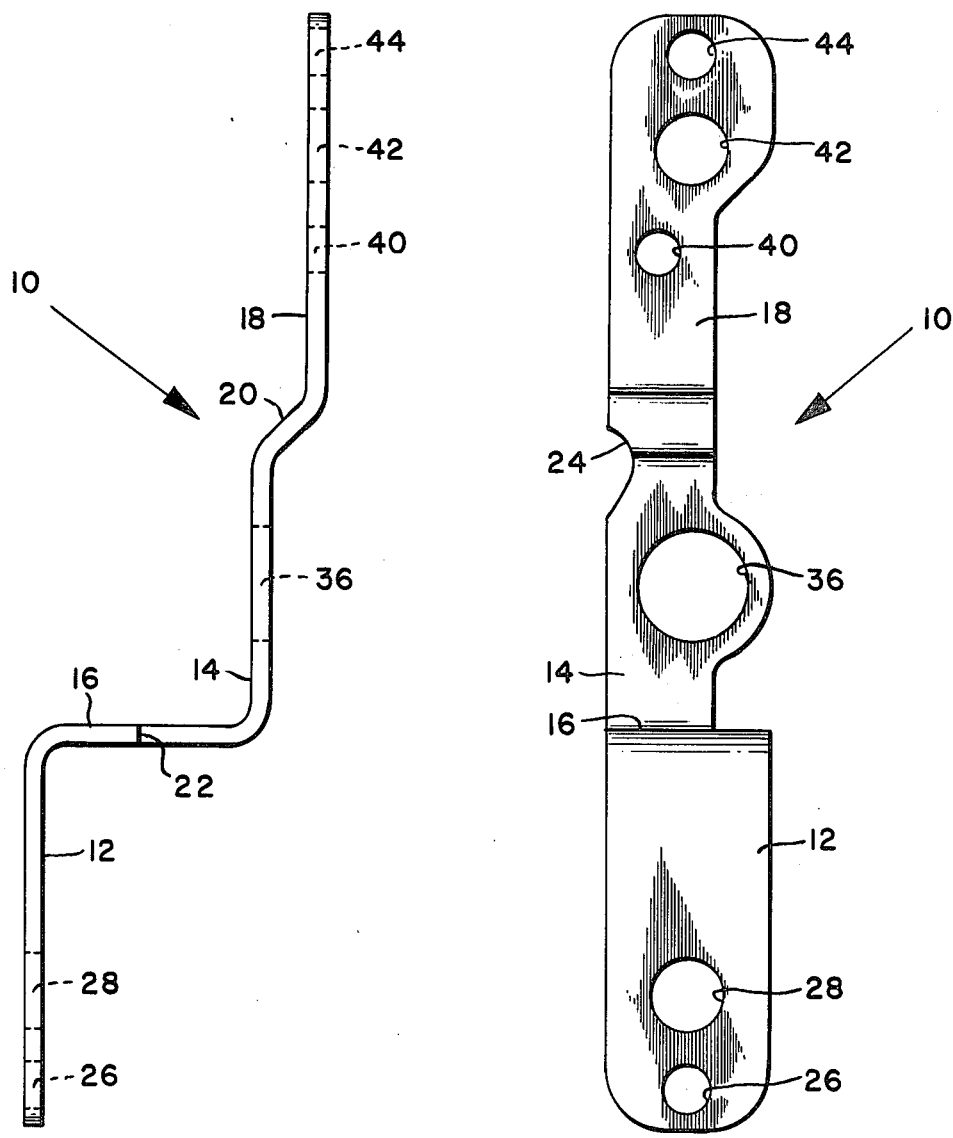
FIG. 1 is a side elevational view of an adaptor linkage in accordance with the invention.
FIG. 2 is a plan view of the adaptor linkage.

In the preferred embodiment of my invention shown in the drawing, the adaptor linkage is indicated as a whole at 10. As shown in FIGS. 1 and 2, the adaptor linkage 10 comprises a lower linkage portion 12, a center linkage portion 14, a transverse linkage portion 16 that connects the upper end of the lower linkage portion 12 to the lower end of the center linkage portion 14, an upper linkage portion 18 extending upwardly from the center linkage portion 14, and an upper transverse linkage portion 20 extending between the bottom end of the upper linkage portion 18 and the upper end of the center linkage portion 14.

As may be seen in the drawings, the transverse linkage portion 16 has a squared cut or cut out portion 22 at one side, that facing the rear of the transmission when the linkage 10 is mounted thereon, for allowing the linkage 10 to be moved past parts of the transmission without hitting them. At the other side of adjoining portions of the center linkage portion 14 and the upper transverse portion 20, a half moon cut out 24 is similarly provided to allow movement of the linkage 10 past transmission parts without hitting them. The half moon cut out is on the side of the linkage 10 facing the front on the transmission, when the linkage 10 is mounted on the transmission.

Figure 3:
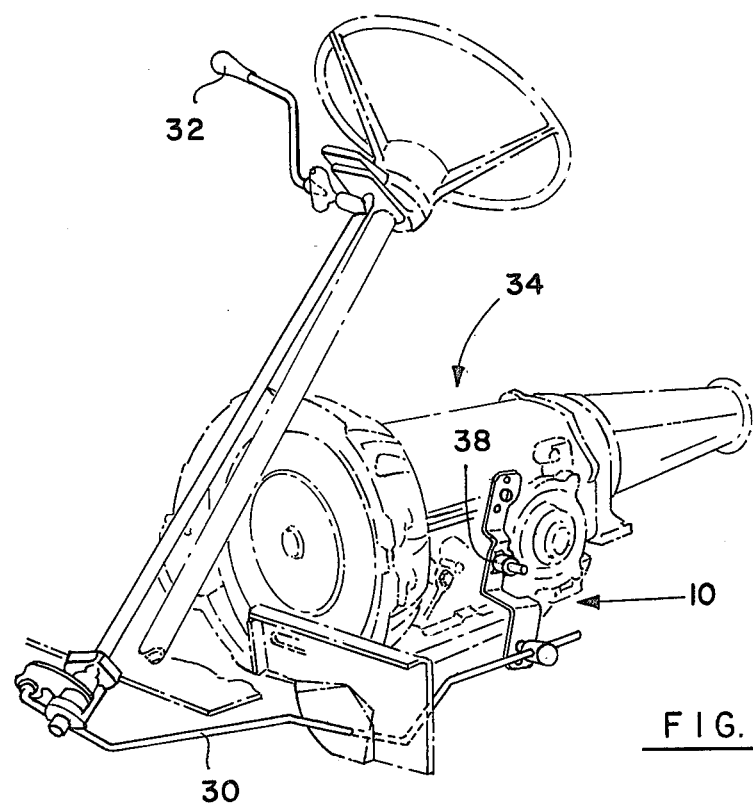
FIGS. 3 and 4 are fragmented, perspective views showing the adaptor linkage mounted on automobile transmissions associated, respectively, with steering column and floor shift gear selectors.
Figure 4:
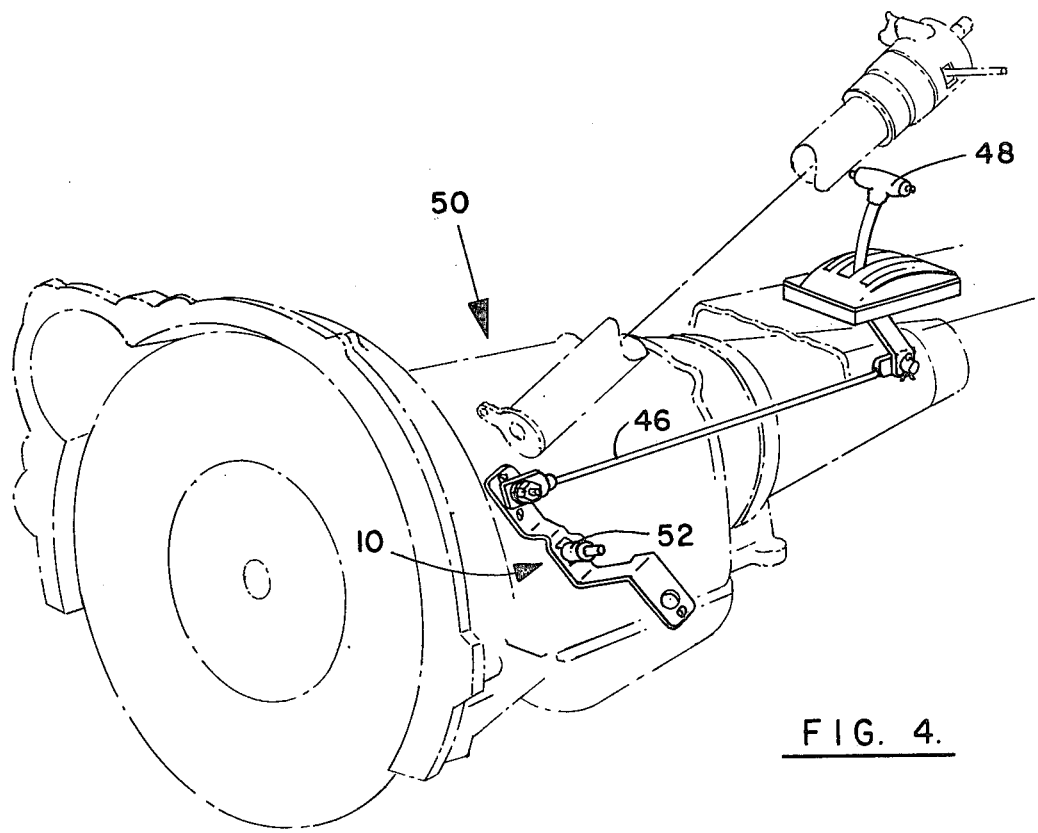

The lower linkage portion 12 is provided with two holes 26 and 28 for selective connection of the adaptor linkage 10 by a linkage rod 30, as seen, for example, in FIG. 3, to a steering column manually operated gear selector lever 32 of an automobile (not shown) having a transmission indicated at 34. Center linkage portion 14 is provided with a hole 36 for connection of the linkage 10 to the gear shift control valve trunnion 38 of the transmission 34. Upper linkage portion 18 also is provided with holes 40, 42 and 44 for selective connection of the adaptor linkage 10 by a shift or linkage rod 46, as seen, for example, in FIG. 4, to a floor shift manually operated gear selector lever 48 of an automobile (not shown) having a transmission 50. Hole 36 of adaptor linkage 10 is connected to a gear shift control valve trunnion 52 of transmission 50. Preferably, the centers of the holes 26, 28, 36, 42 and 44 are located in the same plane, including a plane vertical to the sheet of drawing, as seen in FIG. 2. Hole 40 in upper linkage portion 18 is displaced slightly to the left of that plane.

As those skilled in the art will understand, the positions of the holes 26 and 28 in lower linkage portion 12, and the positions of the holes 40, 42 and 44 in upper linkage portion 18 with respect to the position of center portion hole 36 of the adaptor linkage 10 are determined by the requirements of the transmission and the parameters of the shift or linkage rod supplied with the transmission as original equipment.

By way of illustration and not limitation, an operative embodiment of the adaptor linkage 10, according to the present invention, made of steel and having the dimensions given in the following table may be used on any C4, C5 and FMX transmission provided in automobiles made from the year 1965 through the year 1979.

Table of Dimensions of Linkage 10
Overall length of linkage 10–18½ cm (7 5/16″)
Length of linkage portions:

| Portion | Length |
|---|---|
| 12 | 6.5 cm (2½″) |
| 14 | 4.5 cm (1¾″) |
| 16 | 3.6 cm (1⅜″) |
| 18 | 6.2 cm (2⅜″) |
| 20 | 1.5 cm (⅝″) |

Spacing between lower edge of lower linkage portion 12 and the center line of hole 26—1 cm (⅜″).

Spacing between centers of the holes, all of which are on the same vertical plane extending lengthwise of adaptor linkage 10, as seen in FIG. 2:

| Holes | Spacing |
|---|---|
| 26–28 | 1.6 cm (⅝″) |
| 28–36 | 6.7 (2⅝″) |
| 36–42 | 7.3 cm (2⅞″) |
| 42–44 | 1.6 cm (⅝″) |

Spacing between upper edge of upper linkage portion 18 and the center line of hole 44—0.63 cm (¼″).
Spacing between transverse center lines of the holes:

| Holes | Spacing |
|---|---|
| 36–40 | 5.6 cm (2 3/16″) |

Spacing between longitudinal center lines of holes 36 and 40—0.47 cm (3/16″).
The diameters of the several holes are as follows:

| | |
|---|---|
| 26 | 0.8 cm (5/16 ″) |
| 28 | 1.3 cm (½″) |
| 36 | 1.9 cm (¾″) |
| 40 | 0.8 cm (5/16 ″) |
| 42 | 1.3 cm (½″) |
| 44 | 0.8 cm (5/16 ″) |

It will be understood that adaptor linkage 10 may be made of materials other than steel, if desired, in accordance with the practice in the art. Additionally, changes may be made in details of construction and form of the linkage without departing from the scope of the invention as defined by the appended claims.

I claim:

1. A universal adaptor linkage for connection between the transmission and the shift or linkage rod associated with the gear selector lever of an automobile comprising
   a lower linkage portion having at least one hole therein for selective connection to the shift or linkage rod,
   a center linkage portion having a hole therein for connection to the gear shift control valve trunnion of the transmission,
   a transverse linkage portion for connecting the upper end of the lower linkage portion to the lower end of the center linkage portion,
   an upper linkage portion extending upwardly from the center linkage portion and having at least one hole therein for selective connection to the shift or linkage rod, and
   an upper transverse linkage portion extending between the upper end of the center linkage portion and the lower end of the upper linkage portion.

2. A universal adaptor linkage as specified in claim 1 wherein said transverse linkage portion for connecting the upper end of said lower linkage portion to the lower end of said center linkage portion includes a cut out portion on one side thereof to avoid hitting transmission parts by the adaptor linkage as it is moved.

3. A universal adaptor linkage as specified in claim 2 wherein said cut out portion is in the form of a squared cut.

4. A universal adaptor linkage as specified in claim 1 wherein adjoining portions of said upper transverse and center linkage portions include a cut out portion on one side thereof to avoid hitting transmission parts as it is moved.

5. A universal adaptor linkage as specified in claim 4 wherein said cut out portion is in the form of a half moon.

6. A universal adaptor linkage as specified in claim 3 wherein adjoining portions of said upper transverse and center linkage portions include a cut out portion in the form of a half moon to avoid hitting transmission parts as it is moved, said first and second mentioned cut out portions being on opposite sides of said adaptor linkage.

7. A universal adaptor linkage as specified in claim 1 wherein said lower linkage portion includes two spaced holes therein for selective connection to the shift or linkage rod, and wherein said upper linkage portion includes three holes therein for selective connection to the shift or linkage rod.

8. A universal adaptor linkage as specified in claim 7 wherein the centers of at least two of said holes in said upper linkage portion and the centers of the two holes in said lower linkage portion are located in the same plane.

9. A universal adaptor linkage as specified in claim 8 wherein the center of the third hole in said upper linkage portion is displaced transversely of said linkage from the plane in which the centers of the other holes are located.

10. A universal adaptor linkage as specified in claim 9 for C4, C5 and FMX transmissions wherein adjoining portions of said upper transverse and center linkage portions include a cut out portion in the form of a half moon to avoid hitting transmission parts by the linkage as it is moved, and wherein said lower transverse linkage portion includes a squared cut out portion to avoid hitting transmission parts by the adaptor linkage as it is moved, said squared cut out portion being on a side of the adaptor linkage opposite to that having the half moon cut out portion therein, and the displacement of the third hole in said upper linkage portion being toward the side of the adaptor linkage having the half moon cut out therein.

* * * * *